(12) United States Patent
Bauman et al.

(10) Patent No.: US 7,821,942 B2
(45) Date of Patent: Oct. 26, 2010

(54) CONTROLLING DATA FLOW THROUGH A DATA COMMUNICATIONS LINK

(75) Inventors: Ellen M. Bauman, Rochester, MN (US); Timothy J. Schimke, Stewartville, MN (US); Lee A. Sendelbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 162 days.

(21) Appl. No.: 12/184,541

(22) Filed: Aug. 1, 2008

(65) Prior Publication Data
US 2010/0027423 A1 Feb. 4, 2010

(51) Int. Cl.
*H04J 1/16* (2006.01)
(52) U.S. Cl. ............................ 370/235; 370/236
(58) Field of Classification Search .......... 370/235–236
See application file for complete search history.

(56) References Cited

U.S. PATENT DOCUMENTS 5,953,318 A * 9/1999 Nattkemper et al. ........ 370/236
6,434,118 B1 * 8/2002 Kirschenbaum ......... 370/236.1
6,947,380 B1 * 9/2005 Yip et al. .................... 370/230
2005/0074020 A1 * 4/2005 Nagalkar .................... 370/412

FOREIGN PATENT DOCUMENTS

WO 2006128478 A1 12/2006
WO 2008043390 A1 4/2008

* cited by examiner

*Primary Examiner*—Kevin C Harper
(74) *Attorney, Agent, or Firm*—Biggers & Ohanian, LLP

(57) ABSTRACT

Controlling data flow through a data communications link, the link operating according to a data communications protocol in which a receiver of data communications on the link can suspend data communications on the link for a period of time determined by the receiver, including specifying for the sender a duration for flow control periods; specifying for the sender a number of corrupt communications control packets to be transmitted from the sender to the receiver during a flow control period; determining by the sender whether a flow control message is received from the receiver during a flow control period; altering, in dependence upon whether a flow control message is received from the receiver during a flow control period, the number of corrupt communications control packets; and transmitting, among normal data communications during a subsequent flow control period, the altered number of corrupt communications control packets from the sender to the receiver.

18 Claims, 4 Drawing Sheets

CONTROLLING DATA FLOW THROUGH A DATA COMMUNICATIONS LINK

BACKGROUND OF THE INVENTION

1. Field of the Invention

The field of the invention is data processing, or, more specifically, methods, apparatus, and products for controlling data flow through a data communications link.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas that has seen considerable advance is data communications, although there is still need for improvements in the area. Some data communications protocols, including the IEEE 802.1x protocols, for example, define a rudimentary flow control mechanisms. These are typically based on an "x-on" and "x-off" scheme where, if a receiver becomes congested, the receiver can send a frame back to the originator, a flow control message, which shuts off all communications for a period of time defined in the flow control message. The disadvantage of this scheme is that all sessions running on a given data communications link are interrupted to provide flow control. Sessions with both high and low latency requirements are all interrupted. Sessions which are streaming video/audio information risk harmful interruptions, possibly yielding visible dropouts in the video/audio stream. This x-on/x-off technique does alleviate network congestion—but at the very high price of interrupting all communications sessions on a link regardless of the particular data communications requirements or priorities any particular communications session may be. This means that networks must be over-designed to have lots of additional bandwidth to make sure the flow control is invoked as infrequently as possible.

SUMMARY OF THE INVENTION

This specification describes methods, apparatus, and products that minimize data communications flow control events and yet still provide flow control to keep the network operating smoothly. This specification describes optional additional solutions which provide flow control for high priority sessions and also still maintain flow of lower priority communications sessions. More particularly, this specification describes methods, apparatus, and computer program products for controlling data flow through a data communications link, where the link operates according to a data communications protocol in which a receiver of data communications on the link, upon detecting a lack of bandwidth for a current level of data communications, can, by sending a flow control message to a sender, suspend data communications on the link for a period of time determined by the receiver, including specifying for the sender a duration for flow control periods; specifying for the sender a number of corrupt communications control packets to be transmitted from the sender to the receiver during a flow control period; determining by the sender whether a flow control message is received from the receiver during a flow control period; altering, in dependence upon whether a flow control message is received from the receiver during a flow control period, the number of corrupt communications control packets; and transmitting, among normal data communications during a subsequent flow control period, the altered number of corrupt communications control packets from the sender to the receiver.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
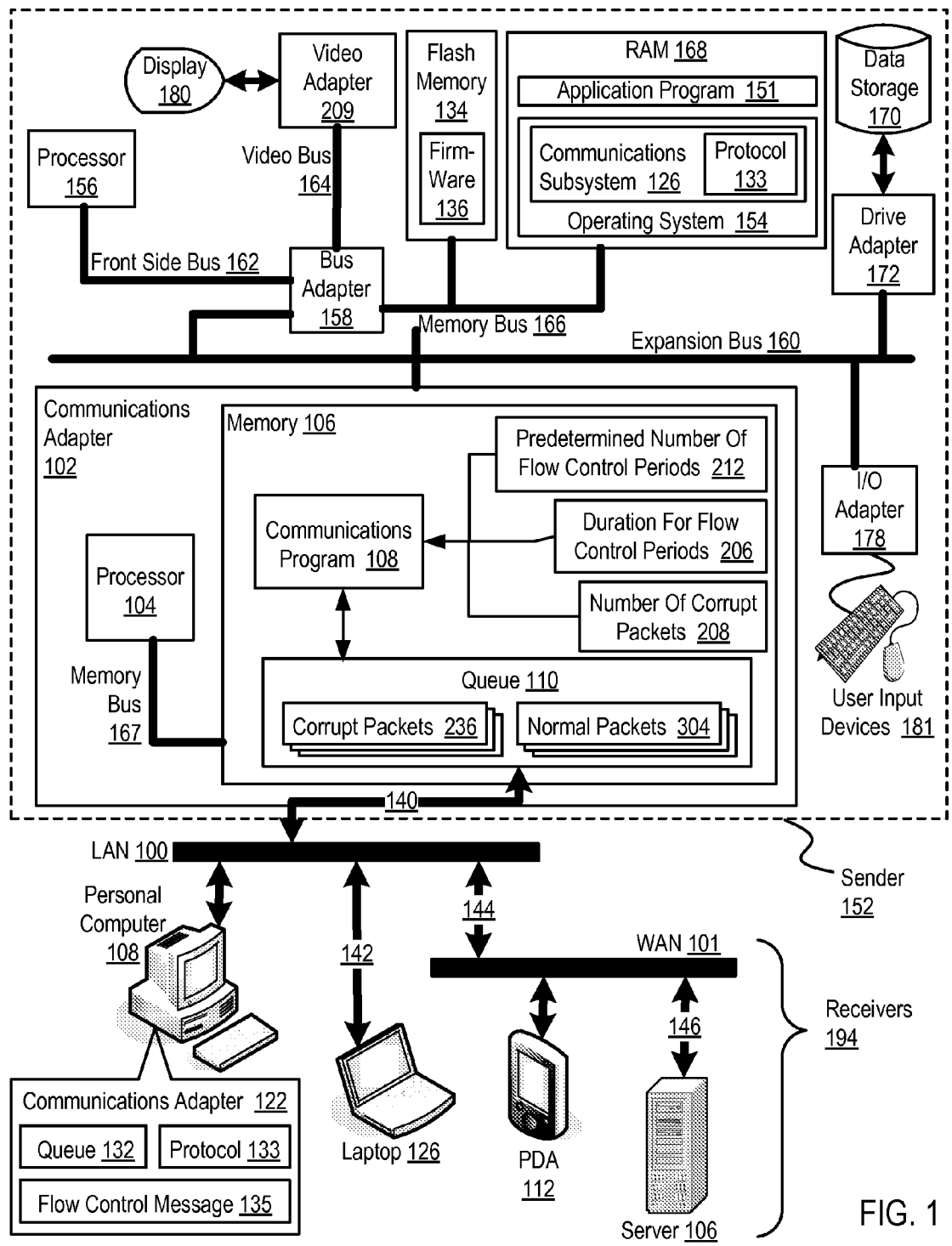
FIG. 1 sets forth a network diagram of a system for controlling data flow through a data communications link according to embodiments of the present invention.

Exemplary methods, apparatus, and products for controlling data flow through a data communications link in accordance with the present invention are described with reference to the accompanying drawings, beginning with FIG. 1. FIG. 1 sets forth a network diagram of a system for controlling data flow through a data communications link according to embodiments of the present invention. The system of FIG. 1 includes a sender of data communications, several receivers (194) of data communications, and two data communications networks (100, 101) through which data communications are transmitted from the sender (152) to one or more of the receivers (194). The networks (100, 101) are represented as a local area network (100) and a wide area network (101). The receivers (194) include a personal computer (108) which is coupled to the sender (152) for data communications through local area network (100), a laptop computer (126) also coupled to the sender (152) for data communications through local area network (100), a personal digital assistant (112) which is coupled to the sender (152) for data communications through local area network (100) and also through the wide area network (101), and a server (106) which is also coupled to the sender (152) for data communications through local area network (100) as well as wide area network (101).

For ease of explanation, as described in more detail below, the sender (152) in this example is represented as an automated device, having a computer processor (156) operatively coupled to computer memory (168) in which is stored computer program instructions that control the operation of the sender. Readers will recognize, however, that the sender can in fact be implemented as almost any automated device capable of data communications, including, for example, a personal computer, a laptop computer, a mobile telephone, a personal digital assistant, a mobile internet device, and so on, as will occur to those of skill in the art.

Readers will recognize that all of the automated devices in the example of FIG. 1 can both send and receive data communications. The terms 'sender' and 'receiver' as used in this specification, however, indicate general roles rather than the specific identity of a particular device with respect to a particular data communications message. A 'sender' as the term is used here is an entity, a computer, another automated device, or a communications adapter, sending message information generally to a receiver. A 'receiver' as the term is used here is an entity, a computer, some other automated device, or a communications adapter, receiving message information generally from a sender. Thus it is the overall direction of message traffic flow that characterizes the sender and the receiver in this specification, rather than the direction of any particular data communications message.

In the example of FIG. 1, the sender (152) is coupled for data communication with the receivers (194) through data communications paths referred to as 'links,' and such data communications between the sender and the receivers is carried out according to at least one data communications protocol (133) in which the links are operated. Such links are represented in the example of FIG. 1 by the data communications path (140, 142) through the local area network (100) from the sender (152) to the receiving laptop computer (126) as well as the data communications path (140, 144, 146) through the local area network (100) and the wide area network (101) from the sender (152) to the receiving server (106).

The example of FIG. 1, for ease of explanation, is illustrated with only one data communications protocol (133), although readers of skill in the art will recognize that such data communications will typically implement more than one data communications protocol with the protocols organized in a stack with interfaces forming the vertical connections in the stack, hardware layer, link layer, network layer, transmission control layer, and so on. It is common in such protocols to enable a receiver to advise a sender to suspend communications for a period of time, when, for example, data is arriving at the receiver faster than the receiver can process the data—evidencing a lack of processing bandwidth on the receive side of the communications. From the senders perspective, such a suspension of communications, effected by the receiver for a period determined by the receiver, can appear as a communications disaster—a massive disruption over which the sender has no control at all.

In this specification, the term 'link' refers to any data communications path or coupling in any layer of any data communications protocol stack that supports flow control by which a receiver can suspend communications from a sender for a period of time determined by the receiver. Such a receiver can detect a lack of bandwidth by, for example, maintaining a receive queue (132) of a fixed size that stores incoming messages while waiting for a receiving application to process each incoming message, tracking the relative fullness of the queue, and interpreting the queues filling beyond some predetermined threshold as a lack of bandwidth. Examples of such protocols include the Ethernet protocol, the 802.1x protocols, and the like, each of which supports a message type such as the 'XOFF' message type or the like that can include as part of the message content a period of time determined by the receiver during which the sender is not permitted to send message traffic to that receiver.

Controlling data flow through a data communications link in accordance with the present invention is generally implemented with computers, that is, with automated computing machinery. In the system of FIG. 1, for example, the sender (152), all the receivers (194), and both networks (100, 101) are implemented to some extent at least as computers. For further explanation, therefore, FIG. 1 sets forth a block diagram of automated computing machinery comprising an exemplary sender (152) useful in controlling data flow through a data communications link according to embodiments of the present invention. The sender (152) of FIG. 1 includes at least one computer processor (156) or 'CPU' as well as random access memory (168) ('RAM') which is connected through a high speed memory bus (166) and bus adapter (158) to processor (156) and to other components of the sender (152).

Stored in RAM (168) is an application program (151), a module of computer program instructions that carries out user-level data processing and utilizes data communication by sending messages to one or more receivers. Also stored in RAM (168) is an operating system (154). Operating systems useful controlling data flow through a data communications link according to embodiments of the present invention include UNIX™, Linux™, Microsoft XP™, AIX™, IBM's i5/OS™, and others as will occur to those of skill in the art. Also stored in RAM as part of the operating system is a communications subsystem (126), a module of computer program instructions that provides services on behalf of the application program to control data flow through a data communications link according to embodiments of the present invention. Examples of communications subsystems that can be improved to control data flow through a data communications link according to embodiments of the present invention include TCP/IP engines, Ethernet drivers, 802.1x drivers, and the like. The application program (151), the operating system (154), and the communications subsystem (126) in the example of FIG. 1 are shown in RAM (168), but many components of such software typically are stored in non-volatile memory also, such as, for example, on a disk drive (170), or in firmware (136) in flash memory (134).

The computer (152) of FIG. 1 includes disk drive adapter (172) coupled through an expansion bus (160) and a bus adapter (158) to the processor (156) and to other components of the sender (152). Disk drive adapter (172) connects non-volatile data storage to the computer (152) in the form of disk drive (170). Disk drive adapters useful in computers for controlling data flow through a data communications link according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for controlling data flow through a data communications link according to embodiments of the present invention include modems for wired dial-up communications, Ethernet (IEEE 802.3) adapters for wired data communications network communications, and 802.11 adapters for wireless data communications network communications.

In this example, the senders communications adapter (102) is itself an automated subsystem of the sender that includes a computer processor (104) and computer memory (106) connected to the processor through a memory bus (167). Disposed within the computer memory of the communications adapter is a communications program (108), a module of computer program instructions for data communications that is improved to control data flow through a data communications link according to embodiments of the present invention. The example communications adapter is configured, in its computer memory (106), with parameters that support controlling data flow through a data communications link according to embodiments of the present invention: a parameter (208) specifying a number of corrupt packets to transmit during a flow control period, a parameter (206) specifying a duration for flow control periods, and a parameter (212) specifying a predetermined number of flow control periods. Together, the communications adapter (102), the application program (151), and the communications subsystem (154) operate the sender to control data flow through a data communications link as follows:

The sender (152) has a specified duration (106) for flow control periods, and the sender has a specification (208) of the number of corrupt communications control packets that are to be transmitted from the sender to a receiver during each flow control period. The sender (152) and the receivers (194) all operate data communications through data communications links, each of which operates according to a data communications protocol (133) in which a receiver of data communications on a link, upon detecting a lack of bandwidth for a current level of data communications, can, by sending a flow control message (135) to the sender, suspend data communications on the link for a period of time determined by the receiver. In such communications, the sender (152) determines whether such a flow control message (135), suspending communications, is received from a receiver during each flow control period. The sender then alters the number of corrupt communications control packets to be transmitted to a receiving during a flow control period in dependence upon whether a flow control message was received from a receiver during a flow control period. The sender then transmits, among normal data communications (304) during a subsequent flow control period, the altered number of corrupt communications control packets (236) from the sender to the receiver.

A corrupt communications control packet (236) is a communications control packet intentionally so corrupted as to cause the receiver, rather than processing the packet in any way, to discard the packet promptly upon receipt. Such a packet is called a 'control' packet in this context, because it's purpose, rather than delivering payload data, is to control send bandwidth while having no effect on processing bandwidth on the receive side—because no application program on the receive side ever sees such a packet; such corrupt packets are discarded low in the communications protocol stack. Such corrupt packets therefore must be sufficiently normal so that they transmit successfully from the sender but are sufficiently corrupt to be discarded at or before their arrival at the receiver. Such corruption can be implemented in a lossy protocol such as the Internet Protocol, for example, where defective packets are routinely dropped, by including in the packet a defective checksum, a short time to live, an unsupported version number, and so on as will occur to those of skill in the art. The use of a short time to live may get a corrupt packet dropped before it reaches the receiver, but such a procedure would still have the beneficial effect of reducing send bandwidth with no reduction of processing bandwidth on the receive side. By so interspersing corrupt communications control packets among normal communications, the sender effectively reduces the send bandwidth available for normal transmissions, thereby slowing down transmission of normal communications, giving the processing functionality on the receive side time to catch up, balancing the send bandwidth with the processing bandwidth on the receive side, and reducing the risk of a flow control message with its serious disruption of data communications from the send side. This approach accepts some reduction of normal send bandwidth in order to reduce the risk of a severely disruptive flow control message.

The sender (152) may alter the number (208) of corrupt communications control packets by incrementing the number of corrupt communications control packets if a flow control message is received during a flow control period and then transmitting the incremented number of corrupt communications control packets during subsequent flow control periods. The sender (152) may alter the number (208) of corrupt communications control packets by decrementing the number of corrupt communications control packets if no flow control message is received during a flow control period and transmitting the decremented number of corrupt communications control packets during subsequent flow control periods. The sender (152) may alter the number (208) of corrupt communications control packets by decrementing the number of corrupt communications control packets only if no flow control message is received during a predetermined number of flow control periods and transmitting the decremented number of corrupt communications control packets during subsequent flow control periods. In addition, normal data communications (304) may be characterized by communications priorities, the sender (152) may enqueue normal data communications (304) into data communications queues (110) according to priority, enqueing the corrupt packets (236) only into a low priority queue, and transmit the altered number of corrupt communications control packets only from the low priority queue.

The arrangement of the sender, the receivers, and the networks making up the example system illustrated in FIG. 1 are for explanation, not for limitation of the present invention. Data processing systems useful for controlling data flow through a data communications link according to various embodiments of the present invention may include additional computers, senders, receivers, network routers, servers, other devices, client-server and peer-to-peer architectures, not shown in FIG. 1, as will occur to those of skill in the art.

Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
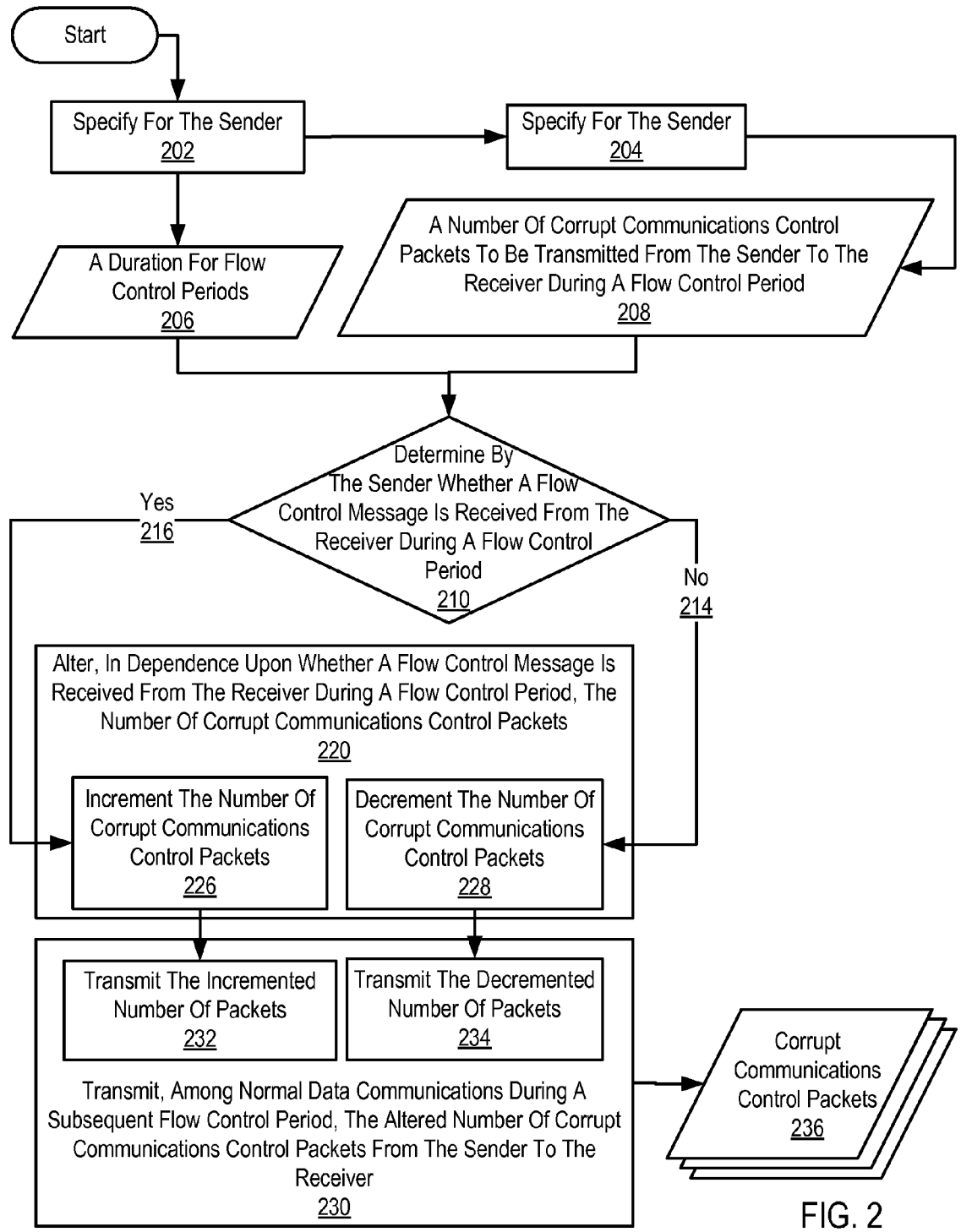
FIG. 2 sets forth a flow chart illustrating an example method of controlling data flow through a data communications link according to embodiments of the present invention.

For further explanation, FIG. 2 sets forth a flow chart illustrating an example method of controlling data flow through a data communications link according to embodiments of the present invention. The link in this example operates according to a data communications protocol in which a receiver (194 on FIG. 1) of data communications on the link, upon detecting a lack of bandwidth for a current level of data communications, can, by sending a flow control message to a sender, suspend data communications on the link for a period of time determined by the receiver. Readers of skill in the art will recognize that the term 'data communications link' typically is used to refer to data communications couplings in the link layer of the ISO data communications protocol stack.

The term 'data communications link' is used in a somewhat broader sense in this specification, however, to refer to any data communications path or coupling in any layer of any data communications protocol stack that supports flow control by which a receiver can suspend communications from a sender for a period of time determined by the receiver. Such a receiver can detect a lack of bandwidth by, for example, maintaining a receive queue of a fixed size that stores incoming messages while waiting for a receiving application to process each incoming message, tracking the relative fullness of the queue, and interpreting the queue's filling beyond some predetermined threshold as a lack of bandwidth. Examples of such protocols include the Ethernet protocol, the 802.1x protocols, and the like, each of which supports a message type such as the 'XOFF' message type or the like that can include as part of the message content a period of time determined by the receiver during which the sender is not permitted to send message traffic to that receiver. From the sender's perspective, such a suspension of communications, effected by the receiver for a period determined by the receiver, can appear as a communications disaster—a disruption over which the sender has no control at all.

As mentioned above, the terms 'sender' and 'receiver' indicate general roles rather than the specific identity of a particular actor with respect to a particular message. A 'sender' as the term is used here is an entity, a computer, another automated device, or a communications adapter, sending message information generally to a receiver. A 'receiver' as the term is used here is an entity, a computer or a communications adapter, receiving message information generally from a sender. That is, the roles 'sender' and 'receiver' are general indications of message traffic flow direction so that, for example, it can be a 'receiver' that sends a flow control message to a 'sender'—because the general direction of message traffic flow is from the sender to the receiver. The transmission of the flow control message from the receiver to the sender is an exception to the overall direction of message traffic flow that characterizes the sender and the receiver.

The method of FIG. 2 includes specifying (202) for the sender a duration (206) for flow control periods. Specifying a duration can be carried out by specifying the duration as an operating parameter for a communications adapter such as, for example, a firmware parameter stored in non-volatile memory at the time of manufacturing a communication adapter. Alternatively, a duration for flow control period can be implemented as a user-defined communications parameter entered at any time through a user interface and stored in firmware in a communications adapter. Specification of a duration for flow control periods also may be implemented in other ways as may occur to those of skill in the art, and all such ways are well within the scope of the present invention. A duration for flow control periods, according to embodiments of the present invention, is a specified period of time during which flow control messages are detected and corrupt communications control packets are transmitted according to embodiments of the present invention.

The method of FIG. 2 includes specifying (204) for the sender a number (208) of corrupt communications control packets to be transmitted from the sender to the receiver during one or more flow control periods. In the method of FIG. 2, a corrupt (236) communications control packet includes a communications control packet intentionally so corrupted as to cause the receiver, rather than processing the packet in any way, to discard the packet promptly upon receipt. The ultimate purpose of transmitting data communication to the receiver is for the communications content, the content of the messages, to be processed by an application program in, on, or associated with the receiver. Normal communications packets are sent at a certain rate from the sender and consumed at a certain rate by the receive-side application. If the processing bandwidth on the receive side is smaller than the send bandwidth, message traffic accumulates in a receive queue, and the communications adapter on the receiver eventually sends a flow control message, disrupting the sender's communications operations. Sending corrupt packets reduces the send bandwidth for normal communications without reducing processing bandwidth on the receive side. The corrupt packets reduce normal send bandwidth for normal communications because they occupy part of the send bandwidth with useless communications packets. The corrupt packets have no effect on processing bandwidth on the receive side because it is the low level processing, such as processing within a communications adapter or a low level protocol engine, that detects the corrupt packets and drops them, never presenting them to the receive-side application for processing.

The method of FIG. 2 includes determining (210) by the sender whether a flow control message is received from the receiver during a flow control period. A flow control message, according to embodiments of the present application, may include, for example, an XOFF packet according to the IEEE 802.1x standard for port-based Network Access Control. As mentioned, receiving such a flow control message disrupts data communications from the perspective of the sender. The sender can determine whether such a flow control message is received during a flow control period by, for example, tracking a duration of a flow control period, counting flow control messages received during the flow control period, observing at the end of the flow control period whether the count of flow control messages is greater than zero, and, if the count is greater than zero, resetting the count to zero for use during a next flow control period.

The method of FIG. 2 also includes altering (220), in dependence upon whether a flow control message is received from the receiver during a flow control period, the number of corrupt communications control packets and transmitting (230), among normal data communications during a subsequent flow control period, the altered number of corrupt communications control packets from the sender to the receiver. In the method of FIG. 2, altering the number of corrupt communications control packets includes incrementing (226) the number of corrupt communications control packets if a flow control message was received during the flow control period so that transmitting (230) the altered number of corrupt communications control packets is carried out by transmitting (232) the incremented number of corrupt communications control packets. In the method of FIG. 2, altering the number of corrupt communications control packets also includes decrementing (228) the number of corrupt communications control packets if no flow control message was received during the flow control period so that transmitting (230) the altered number of corrupt communications control packets then is carried out by transmitting (234) the decremented number of corrupt communications control packets. Readers of skill in the art will recognize that such altering of the number of corrupt communication packets to be transmitted during a flow control period implements a closed-loop control function that controls the send bandwidth for normal communications using as negative feedback the receipt of one or more flow control messages during a flow control period. If no flow control message is received, widen the send bandwidth by sending fewer corrupt packets. If a flow control message is received, narrow the send bandwidth by sending more corrupt packets. Such closed loop control effectively matches the send-side bandwidth for normal communications with the processing bandwidth on the receive side.

Figure 3:
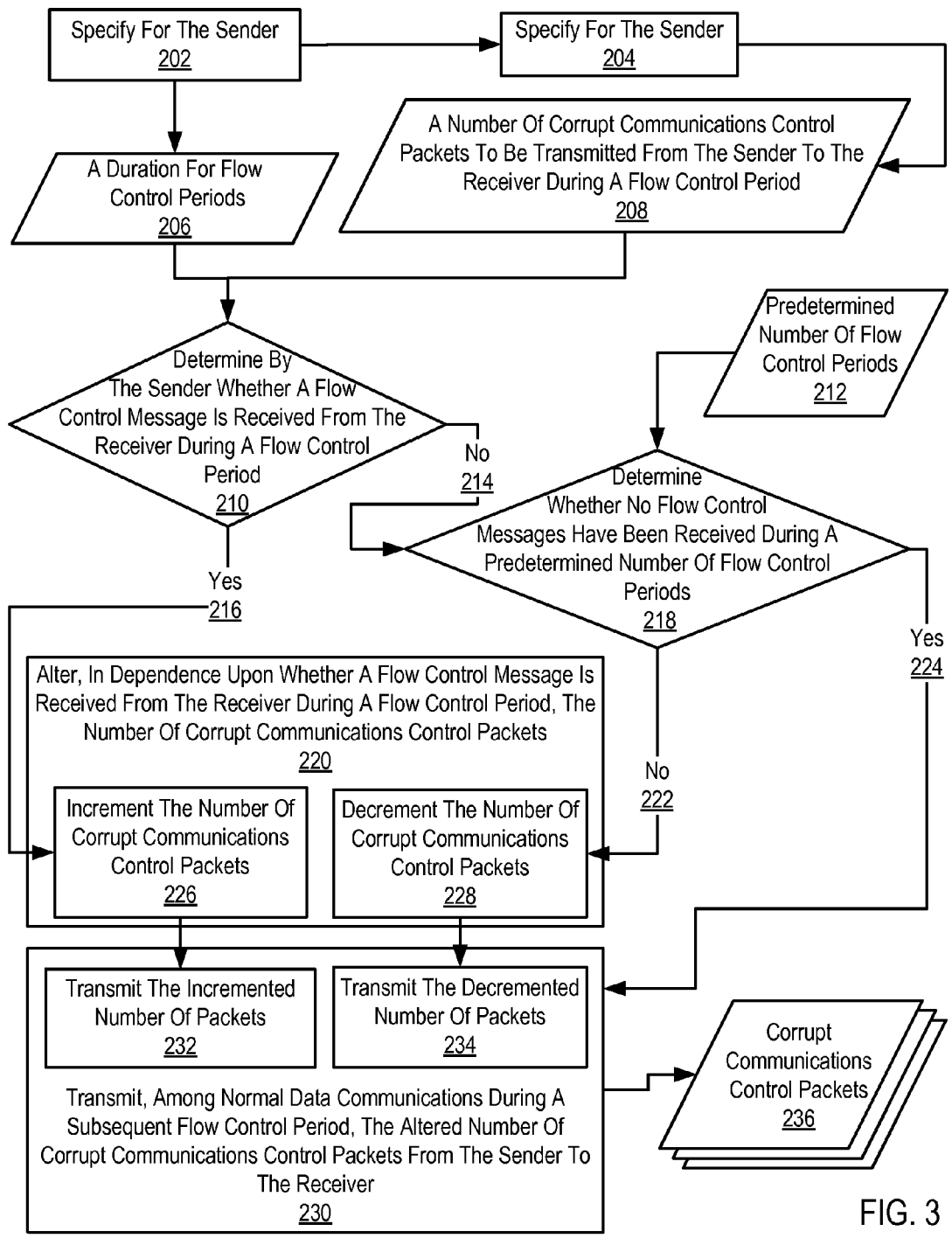
FIG. 3 sets forth a flow chart illustrating a further exemplary method for controlling data flow through a data communications link according to embodiments of the present invention.

For further explanation, FIG. 3 sets forth a flow chart illustrating a further exemplary method for controlling data flow through a data communications link according to embodiments of the present invention. The method of FIG. 3 is similar to the method of FIG. 2, including as it does specifying (202) for the sender a duration (206) for flow control periods, specifying (204) for the sender a number (208) of corrupt communications control packets to be transmitted from the sender to the receiver during one or more flow control periods, determining (210) by the sender whether a flow control message is received from the receiver during a flow control period, altering (220), in dependence upon whether a flow control message is received from the receiver during a flow control period, the number of corrupt communications control packets, and transmitting (230), among normal data communications during a subsequent flow control period, the altered number of corrupt communications control packets from the sender to the receiver, all of which operates in a similar manner as described above with regard to the method of FIG. 2.

In the method of FIG. 3, however, the number of corrupt communications control packets to be transmitted during a flow control period is not decremented every time no flow control message is received during a flow control period. On the contrary, the method of FIG. 3 operates against a predetermined number of flow control periods (212) and includes a determination (218) whether no flow control messages have been received during the predetermined number of flow control periods, decrementing (228) the number of corrupt communications control packets only if (222) no flow control message is received during the predetermined number of flow control periods. In the method of FIG. 3, like the method of FIG. 2, it is the decremented number of corrupt packets that is transmitted (234) in the next flow control period.

In the method of FIG. 3, like the method of FIG. 2, the number of flow control packets to be transmitted during a flow control period is incremented (226) every time a flow control message is received (216) during a flow control period. Readers will recognize that it is the receipt of a flow control message that represents a substantial disruption in communications from the perspective of the sender. The method of FIG. 3 therefore always takes action to reduce the risk of receiving such a flow control message every time one is received—by reducing the send bandwidth for normal message traffic, attempting to match the processing bandwidth on the receive side and therefore reduce the risk of a flow control message.

On the other hand, the fact that no flow control message is received during one or more flow control periods may simply mean that the send and receiver bandwidths have successfully been matched and no further adjustment of the number of corrupt packets is needed to further adjust bandwidth at this particular moment in time. To confirm this, if no flow control message is received, the method of FIG. 3 over time, across a predetermined number (212) of flow control periods, decrements (228) the number of corrupt packets, increasing the send bandwidth for normal packets, until eventually another flow control packet is received (216) and the bandwidth for normal traffic is again decreased by incrementing (226) the number of corrupt packets transmitted during flow control periods. Readers of skill in the art will recognize the inclusion of the requirement for multiple flow control periods without flow control messages before decrementing the number of corrupt packets as an insertion of inertia into a closed loop control, in effect, a directional reduction of loop gain so that the loop is still quick to respond to receipt of flow control messages, but is slower to respond to a lack of flow control messages. In the trivial case where the predetermined number of flow control periods is set to 1, the method of FIG. 3 behaves exactly like the method of FIG. 2. For any predetermined number (212) of flow control periods greater than 1, the loop gain of the method of FIG. 3 is reduced as described.

Figure 4:
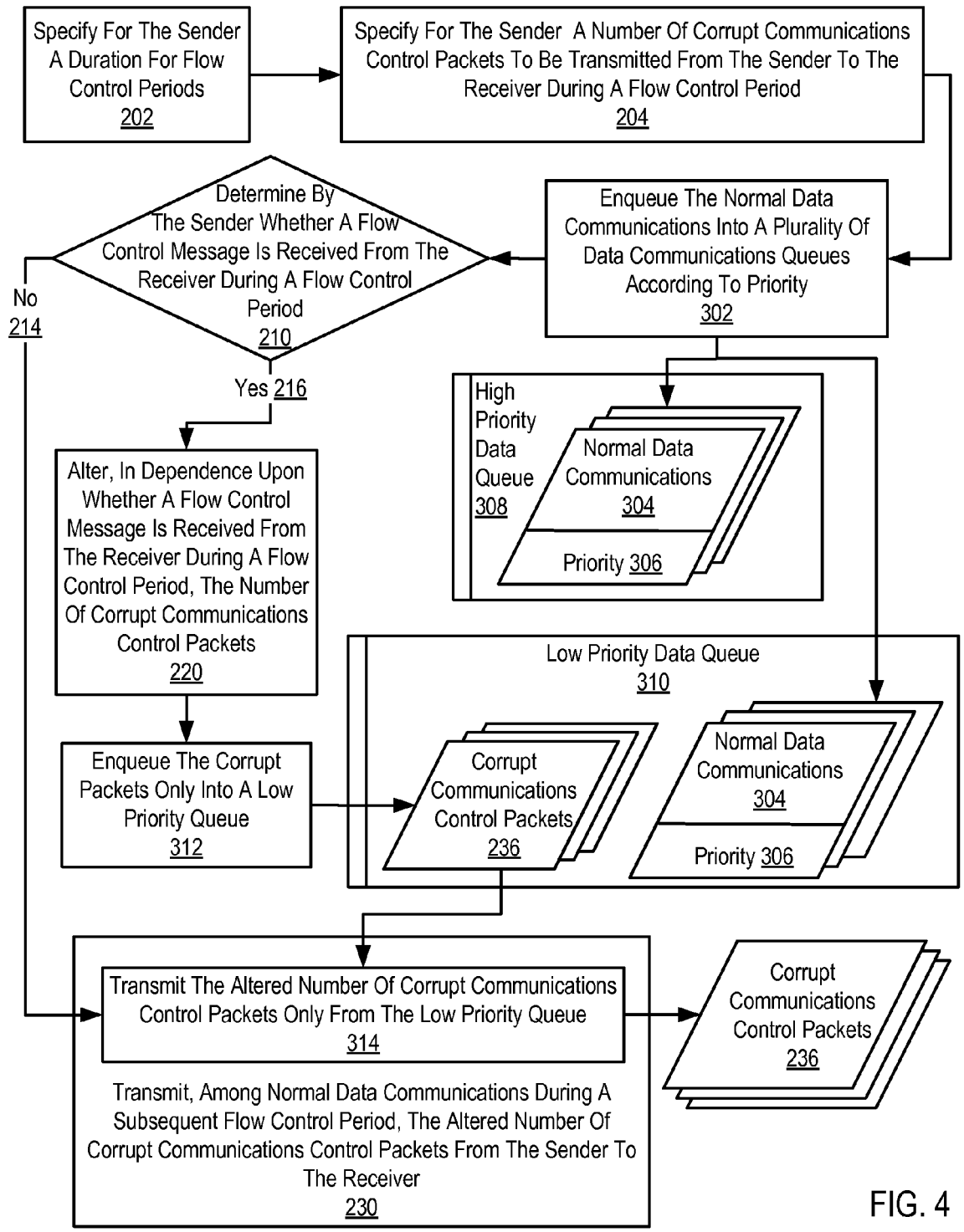
FIG. 4 sets forth a flow chart illustrating a further exemplary method for controlling data flow through a data communications link according to embodiments of the present invention.

For further explanation, FIG. 4 sets forth a flow chart illustrating a further exemplary method for controlling data flow through a data communications link according to embodiments of the present invention. The method of FIG. 4 is similar to the method of FIG. 2, including as it does specifying (202) for the sender a duration (206) for flow control periods, specifying (204) for the sender a number (208) of corrupt communications control packets to be transmitted from the sender to the receiver during one or more flow control periods, determining (210) by the sender whether a flow control message is received from the receiver during a flow control period, altering (220), in dependence upon whether a flow control message is received from the receiver during a flow control period, the number of corrupt communications control packets, and transmitting (230), among normal data communications during a subsequent flow control period, the altered number of corrupt communications control packets from the sender to the receiver, all of which operates in a similar manner as described above with regard to the method of FIG. 2.

In the method of FIG. 4, however, in addition to the functionality of the method of FIG. 2, normal data communications (304) are characterized by communications priorities (306), and the method includes enqueing (302) the normal data communications into a plurality of data communications queues (308, 310) according to priority and enqueing (312) the corrupt packets only into a low priority queue (310). Also in addition to the functionality of the method of FIG. 2, in the method of FIG. 4, transmitting (230) the altered number of corrupt communications control packets from the sender to the receiver includes transmitting (314) the altered number of corrupt communications control packets (236) only from the low priority queue (236). Readers will recognize that normal data communications may be characterized by communications priorities for a number of reasons. Some high priority packets may be required to be delivered by a time certain, for example, for use by real time operating systems. Other high priority packets may be a part of a stream of video or other multimedia data that must be delivered in near real time. Low priorities may be assigned to communications packets in lossy transmission formats, such as, for example, Internet Protocol packets or Ethernet packets. And so on. In an environment where normal data communications (304) are characterized by communications priorities (306), transmitting (314) corrupt communications control packets (236) only from a low priority queue (236) both [1] reduces send bandwidth so as to balance send bandwidth with processing bandwidth on the receive side as described above and [2] minimizes any resulting disruption of high priority communications.

Exemplary embodiments of the present invention are described largely in the context of a fully functional computer system for controlling data flow through a data communications link. Readers of skill in the art will recognize, however, that the present invention also may be embodied in a computer program product disposed on computer-readable, signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of controlling data flow through a data communications link, the link operating according to a data communications protocol in which a receiver of data communications on the link, upon detecting a lack of bandwidth for a current level of data communications, can, by sending a flow control message to a sender, suspend data communications on the link for a period of time determined by the receiver, the method comprising:

specifying for the sender a duration for flow control periods;

specifying for the sender a number of corrupt communications control packets to be transmitted from the sender to the receiver during a flow control period;

determining by the sender whether a flow control message is received from the receiver during a flow control period, wherein the flow control message represents a request issued by the receiver to halt data communications on the link for a period of time determined by the receiver;

altering, in dependence upon whether a flow control message is received from the receiver during a flow control period, the number of corrupt communications control packets; and transmitting, among normal data communications during a subsequent flow control period, the altered number of corrupt communications control packets from the sender to the receiver.

2. The method of claim 1 wherein a corrupt communications control packet comprises a communications control packet intentionally so corrupted as to cause the receiver, rather than processing the packet in any way, to discard the packet promptly upon receipt.

3. The method of claim 1 wherein:

altering the number of corrupt communications control packets further comprises incrementing the number of corrupt communications control packets if a flow control message was received during the flow control period; and transmitting the altered number of corrupt communications control packets further comprises transmitting the incremented number of corrupt communications control packets.

4. The method of claim 1 wherein:

altering the number of corrupt communications control packets further comprises decrementing the number of corrupt communications control packets if no flow control message was received during the flow control period; and transmitting the altered number of corrupt communications control packets further comprises transmitting the decremented number of corrupt communications control packets.

5. The method of claim 1 wherein:

altering the number of corrupt communications control packets further comprises decrementing the number of corrupt communications control packets only if no flow control message is received during a predetermined number of flow control periods; and transmitting the altered number of corrupt communications control packets further comprises transmitting the decremented number of corrupt communications control packets.

6. The method of claim 1 wherein:

the normal data communications are characterized by communications priorities;

the method further comprises enqueing the normal data communications into a plurality of data communications queues according to priority and enqueing the corrupt communications control packets only into a low priority queue; and transmitting the altered number of corrupt communications control packets from the sender to the receiver further comprises transmitting the altered number of corrupt communications control packets only from the low priority queue.

7. Apparatus for controlling data flow through a data communications link, the link operating according to a data communications protocol in which a receiver of data communications on the link, upon detecting a lack of bandwidth for a current level of data communications, can, by sending a flow control message to a sender, suspend data communications on the link for a period of time determined by the receiver, the apparatus further comprising a computer processor, a computer memory operatively coupled to the computer processor, the computer memory having disposed within it computer program instructions capable of:

specifying for the sender a duration for flow control periods;

specifying for the sender a number of corrupt communications control packets to be transmitted from the sender to the receiver during a flow control period;

determining by the sender whether a flow control message is received from the receiver during a flow control period, wherein the flow control message represents a request issued by the receiver to halt data communications on the link for a period of time determined by the receiver;

altering, in dependence upon whether a flow control message is received from the receiver during a flow control period, the number of corrupt communications control packets; and transmitting, among normal data communications during a subsequent flow control period, the altered number of corrupt communications control packets from the sender to the receiver.

8. The apparatus of claim 7 wherein a corrupt communications control packet comprises a communications control packet intentionally so corrupted as to cause the receiver, rather than processing the packet in any way, to discard the packet promptly upon receipt.

9. The apparatus of claim 7 wherein:

altering the number of corrupt communications control packets further comprises incrementing the number of corrupt communications control packets if a flow control message was received during the flow control period; and transmitting the altered number of corrupt communications control packets further comprises transmitting the incremented number of corrupt communications control packets.

10. The apparatus of claim 7 wherein:

altering the number of corrupt communications control packets further comprises decrementing the number of corrupt communications control packets if no flow control message was received during the flow control period; and transmitting the altered number of corrupt communications control packets further comprises transmitting the decremented number of corrupt communications control packets.

11. The apparatus of claim 7 wherein:

altering the number of corrupt communications control packets further comprises decrementing the number of corrupt communications control packets only if no flow control message is received during a predetermined number of flow control periods; and transmitting the altered number of corrupt communications control packets further comprises transmitting the decremented number of corrupt communications control packets.

12. The apparatus of claim 7 wherein:

the normal data communications are characterized by communications priorities;

the apparatus further comprises computer program instructions capable of enqueing the normal data communications into a plurality of data communications queues according to priority and enqueing the corrupt communications control packets only into a low priority queue; and transmitting the altered number of corrupt communications control packets from the sender to the receiver further comprises transmitting the altered number of corrupt communications control packets only from the low priority queue.

13. A computer program product for controlling data flow through a data communications link, the link operating according to a data communications protocol in which a receiver of data communications on the link, upon detecting a lack of bandwidth for a current level of data communications, can, by sending a flow control message to a sender, suspend data communications on the link for a period of time determined by the receiver, the computer program product disposed in a computer readable, recordable medium, the computer program product comprising computer program instructions capable of;

specifying for the sender a duration for flow control periods;

specifying for the sender a number of corrupt communications control packets to be transmitted from the sender to the receiver during a flow control period;

determining by the sender whether a flow control message is received from the receiver during a flow control period, wherein the flow control message represents a request issued by the receiver to halt data communications on the link for a period of time determined by the receiver;

altering, in dependence upon whether a flow control message is received from the receiver during a flow control period, the number of corrupt communications control packets; and transmitting, among normal data communications during a subsequent flow control period, the altered number of corrupt communications control packets from the sender to the receiver.

14. The computer program product of claim 13 wherein a corrupt communications control packet comprises a communications control packet intentionally so corrupted as to cause the receiver, rather than processing the packet in any way, to discard the packet promptly upon receipt.

15. The computer program product of claim 13 wherein:

altering the number of corrupt communications control packets further comprises incrementing the number of corrupt communications control packets if a flow control message was received during the flow control period; and transmitting the altered number of corrupt communications control packets further comprises transmitting the incremented number of corrupt communications control packets.

16. The computer program product of claim 13 wherein;

altering the number of corrupt communications control packets further comprises decrementing the number of corrupt communications control packets if no flow control message was received during the flow control period; and transmitting the altered number of corrupt communications control packets further comprises transmitting the decremented number of corrupt communications control packets.

17. The computer program product of claim 13 wherein:

altering the number of corrupt communications control packets further comprises decrementing the number of corrupt communications control packets only if no flow control message is received during a predetermined number of flow control periods; and transmitting the altered number of corrupt communications control packets further comprises transmitting the decremented number of corrupt communications control packets.

18. The computer program product of claim 13 wherein:

the normal data communications are characterized by communications priorities;

the computer program product further comprises computer program instructions capable of enqueing the normal data communications into a plurality of data communications queues according to priority and enqueing the corrupt communications control packets only into a low priority queue; and transmitting the altered number of corrupt communications control packets from the sender to the receiver further comprises transmitting the altered number of corrupt communications control packets only from the low priority queue.

* * * * *